(12) United States Patent
Kobayashi et al.

(10) Patent No.: US 8,987,965 B2
(45) Date of Patent: Mar. 24, 2015

(54) ROTOR AND PERMANENT MAGNET ROTATING MACHINE

(75) Inventors: Hideki Kobayashi, Tokyo (JP); Yuhito Doi, Tokyo (JP); Takehisa Minowa, Echizen (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 172 days.

(21) Appl. No.: 13/044,084

(22) Filed: Mar. 9, 2011

(65) Prior Publication Data

US 2011/0234038 A1 Sep. 29, 2011

(30) Foreign Application Priority Data

Mar. 23, 2010 (JP) ................................. 2010-066145

(51) Int. Cl.
- *H02K 1/02* (2006.01)
- *H02K 1/27* (2006.01)
- *H02K 21/16* (2006.01)

(52) U.S. Cl.
CPC .................. *H02K 1/02* (2013.01); *H02K 1/276* (2013.01); *H02K 21/16* (2013.01)
USPC ............. 310/156.43; 310/156.53; 310/156.56

(58) Field of Classification Search
CPC .............................. H02K 1/276; H02K 1/2766
USPC ......................... 310/156.43, 156.53
See application file for complete search history.

(56) References Cited

U.S. PATENT DOCUMENTS

| | | | |
|---|---|---|---|
| 7,531,933 B2 | 5/2009 | Miyata et al. | |
| 2007/0151632 A1* | 7/2007 | Komuro et al. | 148/300 |
| 2007/0284960 A1* | 12/2007 | Fulton et al. | 310/156.53 |
| 2008/0054736 A1* | 3/2008 | Miyata et al. | 310/44 |
| 2008/0245442 A1 | 10/2008 | Nakamura et al. | |
| 2009/0224615 A1* | 9/2009 | Komuro et al. | 310/46 |
| 2010/0109468 A1* | 5/2010 | Natsumeda et al. | 310/156.43 |
| 2011/0068651 A1* | 3/2011 | Miyata et al. | 310/156.43 |
| 2011/0080066 A1* | 4/2011 | Doi et al. | 310/156.43 |

FOREIGN PATENT DOCUMENTS

| | | | |
|---|---|---|---|
| JP | 2008-061333 | 3/2008 | |
| JP | 2008-130781 | 6/2008 | |
| JP | 2009-254092 | 10/2009 | |
| WO | WO 2006/043348 A1 | 4/2006 | |
| WO | WO2007088718 | * 8/2007 | H01F 1/53 |

OTHER PUBLICATIONS

Machine translation of WO2007088718, Aug. 2007, Morimoto et al.*
Machida et al. "Grain Boundary Modification and Magnetic Properties of Nd-Fe-B Sintered Magnets", *Abstracts of Spring Meeting of Japan Society of Powder and Powder Metallurgy*, 3 pages (2004).
Office Action corresponding to Japanese Application No. 2011-059350 dated Dec. 13, 2013.

* cited by examiner

*Primary Examiner* — Terrance Kenerly
(74) *Attorney, Agent, or Firm* — Myers Bigel Sibley & Sajovec, P.A.

(57) ABSTRACT

A rotor adapted for a large permanent magnet rotating machine having high output and demagnetization resistance and the permanent magnet rotating machine are provided. The permanent rotating machine includes the rotor and a stator disposed with a clearance from an outer peripheral face of the rotor and formed by winding a winding wire through a stator core having two or more slots. The rotor includes one or more permanent magnets in each of two or more insertion holes, the insertion holes being formed in a circumferential direction in a rotor core. There is also provided the permanent magnet rotating machine including this rotor and a stator disposed with a clearance from an outer peripheral face of the rotor and formed by winding a winding wire through a stator core having two or more slots.

9 Claims, 4 Drawing Sheets

ROTOR AND PERMANENT MAGNET ROTATING MACHINE

CROSS-RELATED APPLICATIONS

This application claims priority from Japanese Patent Application No. 2010-066145; filed Mar. 23, 2010, the disclosure of which is incorporated herein by reference in its entirety.

BACKGROUND OF THE INVENTION

The present invention relates to a rotor used for a permanent magnet rotating machine comprising the rotor comprising a plurality of permanent magnets embedded in a rotor core and a stator formed by winding a winding wire through a stator core having a plurality of slots, the rotor and the stator disposed with a clearance interposed therebetween (which the machine is so-called a magnet-embedded rotating machine or an IPM (interior permanent magnet) rotating machine), and particularly to a rotor adapted for a permanent magnet rotating machine best suited for a large wind power generator and the like.

An Nd-based sintered magnet is used for more and more various purposes because of its excellent magnetic properties. In recent years, in a field of rotating machines such as a motor and a generator, permanent magnet rotating machines comprising the Nd-based sintered magnets have been developed as devices are reduced in weight, thickness, length, and size, improved in performance, and become more energy-efficient. Because it is possible to utilize reluctance torque by magnetization of a rotor yoke in addition to torque by magnetization of magnets in an IPM rotating machine having the magnets embedded in a rotor, the machine has been studied as a high-performance rotating machine. Because the magnets are embedded in the rotor yoke of silicon steel sheets or the like, the magnets do not jump out due to centrifugal force during rotation. Accordingly, the rotating machine has high mechanical safety, can be operated with high torque and at a wide range of rotation speed by controlling a phase of current, and can be an energy-efficient, highly efficient, and high-torque motor. In recent years, the applications such as a motor or a generator for an electric car, a hybrid car, a high-performance air conditioner, industrial purposes, a train and the like have been rapidly expanding.

For the future, the Nd-based sintered magnet is expected to be applied to a large wind power generator. Higher efficiency, increase in an electric generating capacity, improvement of electric power quality, and a lower failure rate are required of the large wind power generator. For this reason, use of the rotating machine comprising the Nd-based sintered magnet for wind power is expected to expand rapidly for the future.

In general, the permanent magnet in the rotating machine is apt to be demagnetized by the action of diamagnetic fields due to the winding wire so that a magnetic coercive force has to be the same as or higher than a certain value. Because the magnetic coercive force reduces as temperature increases, the magnet having a greater room-temperature magnetic coercive force is required when it is used for high-speed rotation in which heat generation due to an eddy current in the magnet is not ignorable. On the other hand, a residual magnetic flux density which is an index of magnetic force needs to be as high as possible because it directly influences the electric generating capacity.

There is a tradeoff relationship between the magnetic coercive force and the residual magnetic flux density of the Nd-based sintered magnet so that the residual magnetic flux density decreases as the magnetic coercive force increases. Accordingly, there is a problem that the electric generating capacity reduces when the magnet having an unnecessarily high magnetic coercive force are used for the generator.

In recent years, as reported in WO2006/043348A1 and in Kenichi Machida, Takashi Kawasaki, Shunji Suzuki, Masahiro Ito and Takashi Horikawa, "Grain Boundary Reforming and Magnetic Properties of Nd—Fe—B-based Sintered Magnet", Abstracts of Lectures of Japan Society of Powder and Powder Metallurgy, Spring Meeting in 2004, p. 202, there is a method for increasing a magnetic coercive force without reducing a residual magnetic flux density in which Dy (dysprosium) or Tb (terbium) is diffused from a surface to an inside of a sintered magnet. Because it is possible to efficiently thicken Dy and Tb at a grain boundary by the method, it is possible to increase the magnetic coercive force with little reduction in the residual magnetic flux density. Moreover, the smaller the size of the magnet, the further Dy or Tb diffuses inward so that the method can be applied to a small or thin magnet.

Reported in JP 2008-061333A is a surface magnet rotating machine (so-called a SPM (surface permanent magnet) rotating machine) comprising magnets having been subjected to diffusion of Dy or Tb. It is effective to increase the magnetic coercive force of thin portion of the D-shaped magnet and such a magnet is obtained by diffusing Dy or Tb to the magnet.

SUMMARY OF THE INVENTION

The present invention has been made under the above circumstances and an object of the invention is to provide a rotor adapted for a large permanent magnet rotating machine having high output and demagnetization resistance and the permanent magnet rotating machine.

The present inventors have studied hard to achieve the above object and, as a result, found that, in an IPM rotating machine comprising a plurality of permanent magnets, it is effective to use the permanent magnets each having a higher magnetic coercive force in an outer peripheral side of the rotor (i.e., in a stator-side surface region) than a magnetic coercive force in an inner portion of the permanent magnet. In a large wind power generator having rated output higher than 1 MW, a rotation speed of a rotor of the generator is about 2000 rpm at the maximum. At such a low rotation speed, an eddy current in the magnets is not large and heat generation does not become a problem. Therefore, with regard to the demagnetization, it is not necessary to consider reduction of the magnetic coercive force due to the eddy current. With regard to the demagnetization, it is necessary to consider diamagnetic fields caused by stator coils.

JP 2008-061333A discloses that, self diamagnetic fields are large in thin portions of the D-shaped magnets in an SPM rotating machine so that demagnetization is likely to occur in these portions, and that it is an effective method to subject the thin portions to a diffusion treatment of Dy or Tb because the portions are thin so that the magnetic coercive force sufficiently increases even inside the portions. On the other hand, rectangular magnets used in an IPM rotating machine are uniform in the magnet thickness and there is no great difference in the magnitude of self diamagnetic fields. Moreover, in large magnets used for a large generator, Dy or Tb is not diffused to the inside to increase the magnetic coercive force. Accordingly, the diffusion method has not been considered effective in the IPM rotation machine.

However, the present inventors have found that increase of the magnetic coercive force only in the surface region which has been subjected to the diffusion is useful in the larger generator of the IPM rotating machine. The diffusion treatment is considered to have an effect of increasing the magnetic coercive force in the region of from surface to depth of less than 5 mm. Increase in the magnetic coercive force is considered to gradually become smaller at a deeper position from the surface of the magnet. We have found that increase of the magnetic coercive force is extremely effective in the region of from the surface to depth of about 3 mm in the IPM rotating machine of the large wind power generator.

In the large wind power generator, measures against natural disasters are important and it is necessary to consider magnet demagnetization in all situations especially in the permanent magnet rotating machine. The most severe magnet demagnetization condition is a large diamagnetic field due to a short-circuit current of the generator. Such a short-circuit current is caused by breakage of a device for controlling output of the generator due to a lightning strike, for example. This short-circuit current is several times as high as the current during rated operation and a diamagnetic field at this time is also several times larger. The short-circuit current generated in the coils causes a large flow of a magnetic flux through a stator, a clearance and a rotor. Part of the flow of the magnetic flux acts as the diamagnetic fields on the magnets and causes the demagnetization. Major part of the magnetic flux flows into the rotor core which is made of soft magnetic material and part of it leaks into the magnets. It has been found that the leaked magnetic flux flows especially into a region of from a stator-side surface to a depth of 3 mm or less of the magnet in a rotating machine used in a large generator having a rated output of 1 MW or higher, the rotating machine comprising a rotor having a diameter of 500 mm or greater. In other words, it has been found that it is possible to reduce a possibility of demagnetization to a large extent by increasing the magnetic coercive force in the region of about 3 mm in the stator side.

As a method for increasing the magnetic coercive force, the above-described method by the diffusion treatment is suitable. If a commonly selected magnet having a high magnetic coercive force throughout the magnet is used, the residual magnetic flux density reduces so that the generator output reduces. Because the above-described method by the diffusion treatment can increase the magnetic coercive force in a region of from the surface to the depth of less than 5 mm of the magnet with little reduction in the residual magnetic flux density, the method is considered the best suited. Although the increase in the magnetic coercive force resulting from the diffusion treatment is smaller at a deeper position from the surface, the method by the diffusion treatment is considered sufficiently effective because JP 2008-061333A reports an increase in the magnetic coercive force of 300 kA/m with regard to a portion of the 9 mm thickness of the magnet having been subjected to Dy diffusion and a further large increase by Tb diffusion.

As described above, the present inventors have considered that the above approach of increasing the coercive force by diffusing Dy or Tb in a coating method or a sputtering method is very effective as a measure against the magnet demagnetization of the IPM rotating machine of the large wind power generator. By using the magnets in which the magnetic coercive force is increased in the stator-side region by such a approach, it is possible to prevent the demagnetization when the short-circuit current flows through the generator to generate the large diamagnetic fields in the stator-side region of the magnets and it is possible to increase the output of the rotating machine because of the higher residual magnetic flux density than the other approaches which increase the magnetic coercive force.

As described above, the rotation speed is relatively low in the large wind power generator so that the eddy current through the magnets is low and there is little chance of heat generation. However, when a rotating machine has a poor heat radiation or is used at high rotation speed, the heat generation caused by the eddy current becomes a problem especially. In order to reduce the eddy current by dividing a path P through which the eddy current flows, it is effective to divide the magnet as shown in FIG. 7. Moreover, it is also effective that each of magnet pieces into which the magnet has been divided is subjected to the diffusion treatment to prevent the demagnetization. In this case, it is effective to use the magnets in which four faces through which the eddy current is likely to flow, i.e., the four faces parallel to a magnetization direction M in FIG. 7 have been subjected to the diffusion treatment for increasing the magnetic coercive force in surface regions of the four faces.

The invention provides a rotor adapted for a permanent magnet rotating machine comprising the rotor and a stator disposed with a clearance from an outer peripheral face of the rotor and formed by winding a winding wire through a stator core having two or more slots, the rotor comprising one or more permanent magnets in each of two or more insertion holes, the holes being formed in a circumferential direction in a rotor core, wherein a magnetic coercive force in a stator-side surface region of each of the permanent magnets is greater than that in an inner central portion by 300 kA/m or more, the inner central portion being an inner portion at a depth of at least 5 mm from every outer face of the permanent magnet. The invention also provides the permanent magnet rotating machine comprising this rotor and a stator disposed with a clearance from an outer peripheral face of the rotor and formed by winding a winding wire through a stator core having two or more slots.

According to the invention, by using a rotor comprising one or more permanent magnets having a high residual magnetic flux density and a high magnetic coercive force, especially a high magnetic coercive force in the surface region close to the stator, it is possible to provide the IPM rotating machine having high output and high demagnetization resistance and being suitable for the magnet generator of the large wind power generation.

DETAILED DESCRIPTION OF THE PREFERRED EMBODIMENT

The present invention now will be described more fully hereinafter in which embodiments of the invention are provided with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise.

Unless otherwise defined, all technical and scientific terms used herein have the same meaning as commonly understood by one of ordinary skill in the art to which this invention belongs.

A rotor of a permanent magnet rotating machine according to the present invention is a rotor used for an IPM permanent magnet rotating machine comprising the rotor having a plurality of permanent magnets embedded in a rotor core and a stator formed by winding a winding wire through a stator core having a plurality of slots, the rotor and the stator being disposed with a clearance interposed therebetween. In the invention, a magnetic coercive force in a vicinity of a surface of each of the plurality of permanent magnets in an outer periphery side of the rotor is greater than a magnetic coercive force in an inner portion.

Figure 1:
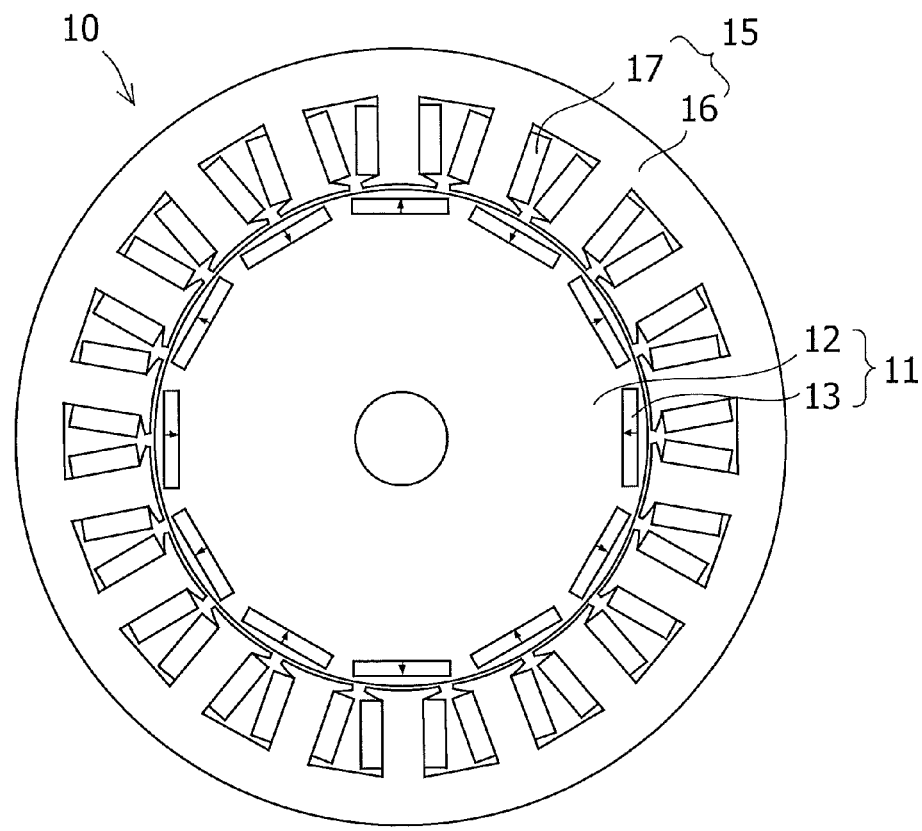
FIG. 1 shows an example of an IPM rotating machine in the invention.

As such an IPM rotating machine, one of the examples is shown in FIG. 1. The IPM rotating machine 10 in FIG. 1 comprising a rotor 11 having a 12-pole structure and having a plurality of permanent magnets 13 embedded in a rotor core 12 which is a laminate of magnetic steel sheets is shown as an example. The number of poles is selected according to a purpose of the rotating machine. A stator 15 is a laminate of magnetic steel sheets and has 18 slots. The stator 15 comprises a coil 17 wound around each of teeth of a stator core 16. The coils form three-phase Y-connections. Arrows in FIG. 1 show magnetization directions of the respective permanent magnets. The magnetization directions are parallel to radial directions of the rotor, and the magnetization directions of the magnets adjacent to each other in a circumferential direction are opposite to each other.

The permanent magnet to be used is preferably an Nd-based rare earth sintered magnet. The rare earth sintered magnet is much more excellent in the residual magnetic flux density and the magnetic coercive force than other magnets. The Nd-based rare earth sintered magnet is less expensive and more excellent in the residual magnetic flux density than an Sm-based rare earth sintered magnet and therefore is magnet material best suited for a high-performance rotating machine. As the Nd-based rare earth sintered magnet may include a sintered magnet having an Nd—Fe—B composition, which is $Nd_2Fe_{14}B$, for example. One permanent magnet piece may be embedded in each of the insertion holes of the rotor. Alternatively, two or more permanent magnet pieces into which a magnet is divided may be bonded to each other by using an adhesive to form a laminate and embedded in an insertion hole, or two or more permanent magnet pieces may form a laminate without using the adhesive and embedded in an insertion hole.

In the invention, as described above, the magnet in which the magnetic coercive force in the vicinity of the surface close to the stator side is greater than that in the inner portion is used. This magnet can be formed by diffusing Dy or Tb from the surface toward the inside of the magnet by using the above-described coating method or sputtering method. The magnet is typically in form of a rectangle, preferably a square having a side of 10 mm or longer or a rectangle having a short side of 10 mm or longer with the thickness also of 10 mm or greater. According to the invention, the magnetic coercive force in a stator-side surface region of the permanent magnet is greater than that in an inner central portion by 300 kA/m or more wherein the inner central portion is an inner portion at a depth of at least 5 mm from every outer shape face of the permanent magnet. The inner central portion is the portion that is away from an outer surface of the whole permanent magnet and is hardly influenced by the diffusion in the coating method or the sputtering method.

The approach for diffusing Dy or Tb from the surface toward the inside of the magnet in the coating method or the sputtering method is described in WO2006/043348A1 and JP 2008-061333A and can be sometimes called "surface treatment by a grain boundary diffusion alloy method". In this method, preferably, a sintered magnet body and powder present on the surface of the sintered magnet body are thermally treated at a temperature lower than or equal to a sintering temperature of the sintered magnet body under a vacuum or an inert gas. The powder comprises one or more selected from the group consisting of oxides, fluorides and acid fluorides of one or more elements selected from rare earth elements including Y and Sc. The sintered magnet body may be preferably a sintered magnet body having an $R^1$—Fe—B composition wherein $R^1$ represents one or more selected from rare earth elements including Y and Sc. JP 2008-061333A discloses the SPM rotating machine comprising the magnet having been subjected to the diffusion treatment of Dy or Tb. This SPM rotating machine can be used for the wind power generator.

In the generator adapted for the large wind power generation, a rotor having a diameter of about 500 mm or greater is used. An axial dimension of the rotor is about 500 mm or greater, magnets are laminated in an axial direction, and the plurality of magnets are inserted in an axial direction into each penetrating hole formed in a rotor yoke so as to obtain length approximately equal to the axial length of the rotor.

In general, an eddy current is generated in the magnet of the rotating machine by varying magnetic fields during rotation. The eddy current is converted to heat as Joule loss so that the temperature of the magnet increases. Because the magnetic coercive force of the magnet decreases as the temperature increases, the coercive force decreases significantly so that the magnet is demagnetized when the eddy current is large. Because magnitude of the eddy current is proportional to the square of the varying frequency of the magnetic field, the eddy current loss becomes a problem in the rotating machine having a high speed rotation. On the other hand, the rotor of the large wind power generator is rotated while increasing the rotation speed of rotor blades by about a hundred times. The rotation speed of the rotor of the generator in this case is about 2000 rpm or lower in the large wind power generation of 1 MW or higher. Accordingly, the eddy current at such a low rotation speed is small and the amount of heat generation due to the eddy current loss is small. Consequently, with regard to the necessary magnetic coercive force, it can be said that the eddy current loss does not need to be considered.

A possibility of the demagnetization becomes the highest in the large wind power generator when the short-circuit current flows through the generator during the rated operation. This may happen at the time of accident such as breakage of a semiconductor device for controlling a load during the rated operation. At the time of a short circuit, the current several times as large as the current during rated operation is generated in the coil and the magnetic flux due to coil current flows from the stator into the rotor through the clearance. The large magnetic flux passes through the rotor yoke having high magnetic permeability and part of the magnetic flux leaks out into the magnet region because the rotor approximately entirely becomes saturated with magnetism. Because the magnetic flux leaks mainly into the stator-side surface region of the magnets, the diamagnetic fields become large in these portions to cause the possibility of demagnetization. Accordingly, it is necessary to increase the magnetic coercive force in the stator-side surface region.

Figure 2:
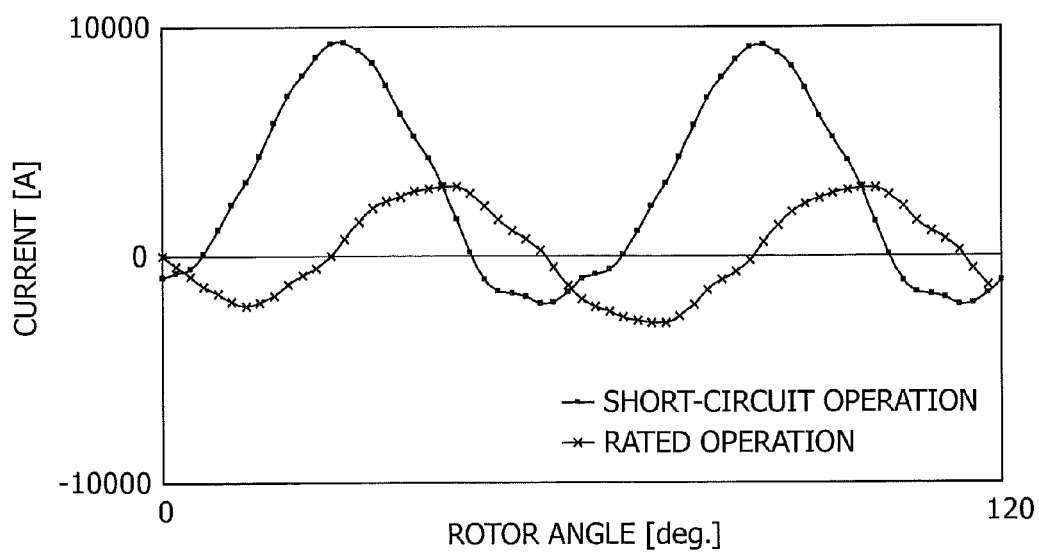
FIG. 2 shows a current waveform when short-circuit current flows.
Figure 3:
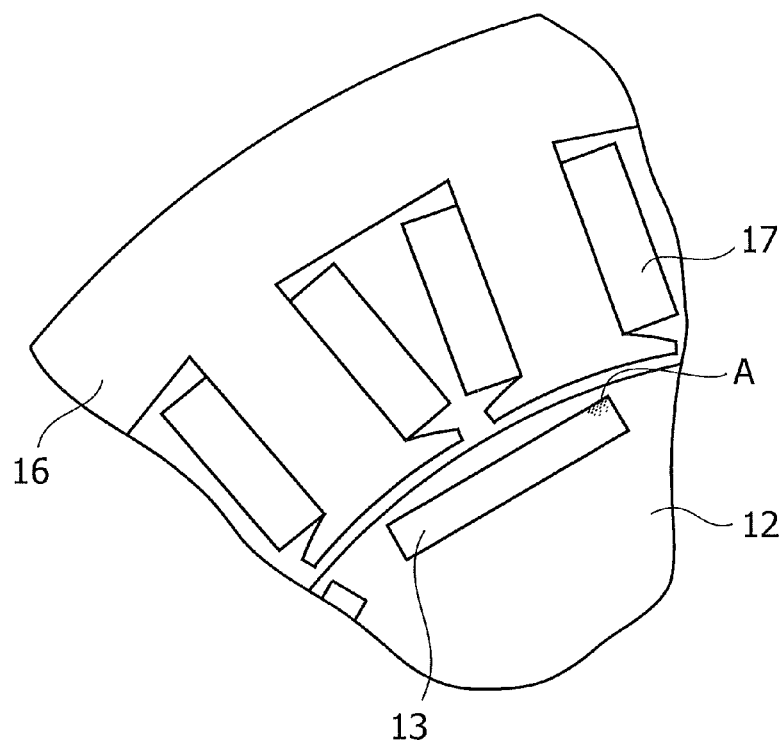
FIG. 3 shows a diamagnetic field distribution in a permanent magnet.

FIG. 2 shows a current waveform when the short-circuit current flows. For comparison, a current waveform during the rated operation is shown as well. It can be seen that the current much larger than the current during the rated operation flows when the short circuit occurs. When the current reaches a peak in the short-circuit current waveform, the diamagnetic field acting on the magnet become the largest. A diamagnetic field distribution in the permanent magnet at this time is shown in FIG. 3. In FIG. 3, the rotor core 12, the permanent magnet 13, the stator core 16 and the coils 17 are shown and it can be seen that the diamagnetic field becomes higher in a portion closer to the surface in the stator-side surface region A of the magnet.

Figure 4:
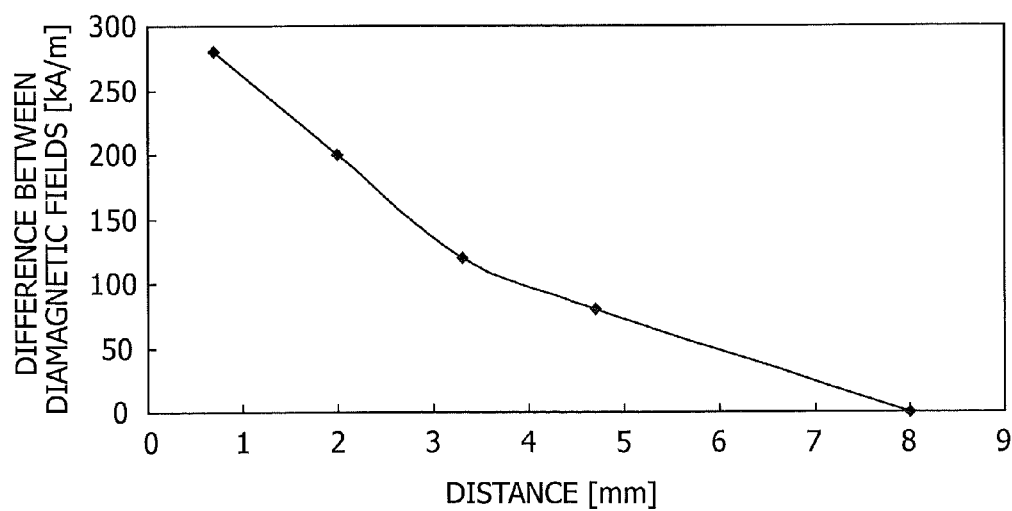
FIG. 4 shows a distance from a stator-side surface of the permanent magnet on a horizontal axis and a difference between a diamagnetic field at each distance (depth) and a diamagnetic field in an inner central portion of the permanent magnet on a vertical axis.

FIG. 4 shows a distance from a stator-side surface of the permanent magnet on a horizontal axis and a difference between a diamagnetic field at each distance (depth) and a diamagnetic field in an inner central portion of the permanent magnet on a vertical axis. It can be seen that the diamagnetic field is larger by about 260 kA/m at a distance of 1 mm from the surface and by about 200 kA/m at a distance of 2 mm from the surface than the diamagnetic field in the inner central portion of the magnet. Accordingly, to prevent the demagnetization, extra magnetic coercive force to compensate for the diamagnetic field is necessary and the suitable required extra magnetic coercive force is about 260 kA/m or more at the distance of 1 mm from the surface and about 200 kA/m or more at the distance of 2 mm from the surface.

Figure 5:
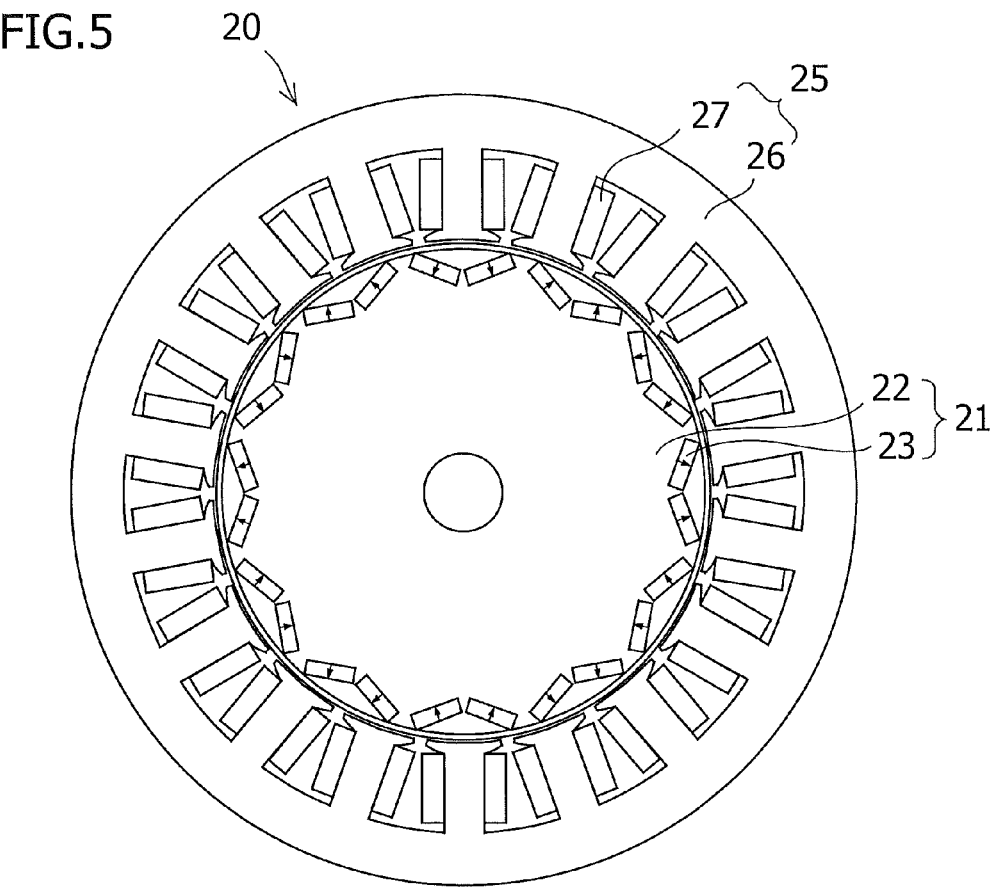
FIG. 5 shows another example of the IPM rotating machine in the invention.

As another example, an IPM rotating machine in which permanent magnets are arranged in shapes of V is shown in FIG. 5. The IPM rotating machine 20 in FIG. 5 comprises a rotor 21 having a plurality of permanent magnets 23 embedded in a rotor core 22 which is a lamination of magnetic steel sheets and a stator 25 comprising coils 27 wound around respective teeth of a stator core 26. Although this example is also the 12-pole 18-coil rotating machine, it is the IPM rotating machine in which two permanent magnets are arranged in the shape of V per pole. Arrows in FIG. 5 show magnetization directions of the respective permanent magnets.

Figure 6:
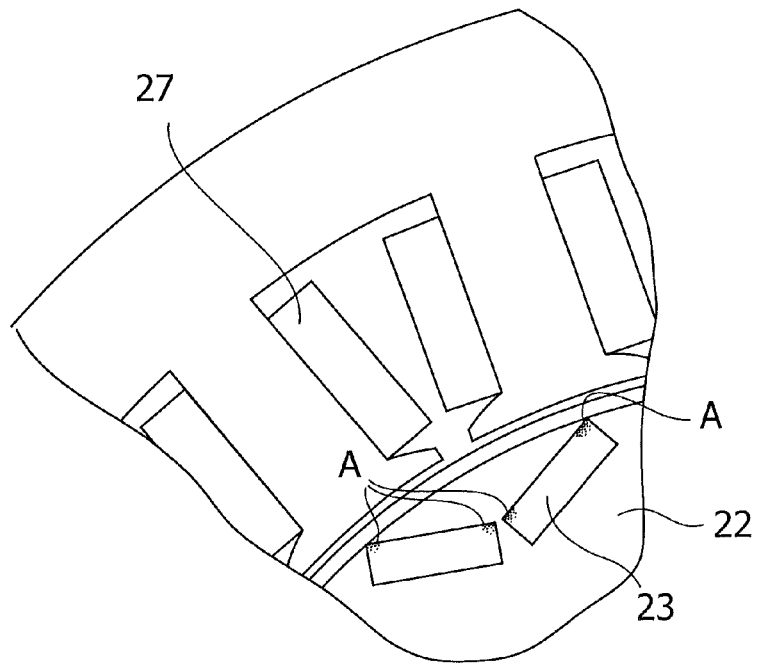
FIG. 6 shows a distribution of diamagnetic fields in permanent magnets when the permanent magnets are disposed in a V shape.
Figure 7:
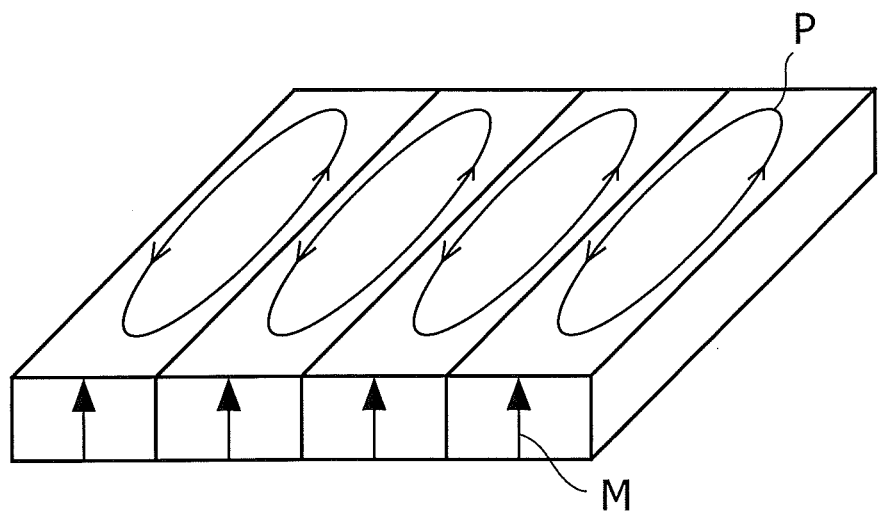
FIG. 7 shows an embodiment where a path through which eddy current flows is divided.

A distribution of diamagnetic fields acting on the magnets when the short-circuit current flows in the IPM rotating machine in which the permanent magnets are disposed in the shapes of V is shown in FIG. 6. In FIG. 6, the rotor core 22, the permanent magnets 23 and the coils 27 are shown. In the same manner as in FIG. 3, the diamagnetic field is stronger in the portions closer to the surface in the stator-side surface region A of the magnet and the values are the same as those in FIG. 4.

From the above, as the magnetic coercive force of the magnet used for the generator such as the large wind power generator, it is suitable to use the magnet in which the magnetic coercive force in the stator-side surface region is higher by about 300 kA/m than that in the inner central portion of the magnet. The stator-side surface region of the magnet is a region of from the surface to the depth of 5 mm or less, preferably a region of from the surface to the depth of 4 mm, more preferably a region of from the surface to the depth of 3 mm, still more preferably a region of from the surface to the depth of 2 mm. Further preferably, the magnetic coercive force in the stator-side surface region of from the surface to the depth of 1 mm of the magnet is higher by 500 kA/m than that in the inner central portion of the magnet.

As the approach for increasing the coercive force in the surface region of the magnet, the above-described diffusion treatment in the coating method or the sputtering method is suitable. Because the effect of increasing the magnetic coercive force by the diffusion treatment is higher in the position closer to the surface of the magnet, increase of the magnetic coercive force by the diffusion treatment is especially effective in a magnet environment having the diamagnetic field distribution shown in FIG. 3. The increase of the magnetic coercive force by the diffusion treatment is about 500 to 800 kA/m in the vicinity of the surface of the magnet depending on treatment conditions and is the sufficient increase of the magnetic coercive force for the magnet having the diamagnetic field distribution shown in FIG. 4. Because the method by the diffusion treatment hardly reduces the residual magnetic flux density, it is possible to keep the residual magnetic flux density higher than the conventional method of using a magnet with high magnetic coercive force so that the electric generating capacity in wind power generation can be increased.

As described above, because it is necessary to increase the magnetic coercive force only in the stator-side surface region of the magnet by the diffusion treatment, only one face of the magnet has to be treated in a diffusion treatment step. However, when the treatment of only one face of the magnet in the coating method or the sputtering method increases cost or reduces productivity due to addition of an extra step such as masking in comparison with the treatment of the all faces, not one face but all the faces may be treated. When all of its faces are treated, the magnetic coercive force increases in all surface regions in the magnet. Such increase in all surface regions does not adversely affect the magnet or the generator and does not become a problem as long as the magnetic coercive force increases at least in the stator-side surface region. On the contrary, when only one face is treated, the magnet has to be inserted into the rotor with this treated face directed toward the stator without fail and therefore it is necessary to take a measure for preventing the mistake that the treated face of the magnet is directed in an opposite direction in assembly. When all the faces are treated, such a mistake will not happen. With these points in view, the magnet with all the faces treated may be used.

EXAMPLES

Although the embodiments of the invention will be described below in detail by using examples, the invention is not limited to them.

Example 1

A plurality of rectangular Nd-based sintered magnets having dimensions of 100 mm by 100 mm by 20 mm and magnetized in a direction of the thickness 20 mm were provided and subjected to the diffusion treatment. The diffusion treatment was carried out by mixing granular dysprosium fluoride with ethanol, immersing the magnets in this mixture wherein faces of each of the magnets excluding one face perpendicular to the magnetization direction were masked, and then heating the magnets in an Ar atmosphere at 900° C. for an hour. Cubes with a side length of 1 mm were cut out from a portion between the center of the face having subjected to the diffusion treatment and the depth at a distance of 1 mm from the treated face, and from an inner central portion, respectively, of one of the magnets. Then magnetic coercive forces measured were 1700 kA/m for the diffusion-treated face of the magnet and 1200 kA/m for the inner central portion of the magnet.

The magnets were mounted in a 12-pole 18-coil generator having a rotor diameter of 600 mm and a shaft length of 1000 mm shown in FIG. 1 such that the faces with the increased magnetic coercive forces were directed toward the stator. Then a power generation test was conducted. A rotor and a stator had lamination structures of magnetic steel sheets having thickness of 0.5 mm and coils were wound in a concentrated manner to form three-phase Y-connections.

When the rated operation was carried out at a rotation speed of 1500 rpm, a load output was about 3 MW and the peak current of the coils was 3000 A. Next, a short-circuit test was conducted by rotating the rotor of the generator at a rotation speed of 1500 rpm with a load short-circuited. As a result, the coil current increased up to 9300 A. After the short-circuit test was finished, electromotive force at the rotation speed of 1500 rmp was measured to study demagnetization of the magnet. The line voltage was 620 V, which was exactly the same value as that before the short-circuit test. Accordingly, it was confirmed that the magnets were not demagnetized at all. Making the magnetic coercive force in the stator-side surface region of the magnet 500 kA/m higher than that in the inner central portion as described above, the generator in which the demagnetization does not occur could be obtained.

Example 2

A plurality of magnets made of the same material and having the same dimensions as those in Example 1 were provided, immersed in the same diffusion treatment solution as that in Example 1 without being masked, and heated in the same manner as in Example 1. Cubes with a side length of 1 mm were cut out from a portion between the centers of the six faces having subjected to the diffusion treatment and the depths at a distance of 1 mm from the centers of the treated six faces, and from an inner central portion, respectively, of one of the magnets. Then magnetic coercive forces measured were 1700 kA/m for each of the six diffusion-treated faces of the magnet and 1200 kA/m for the inner central portion of the magnet.

The magnets were mounted in the same generator as in Example 1, the same short-circuit test was conducted, and electromotive force was measured before and after the test. As a result, the electromotive force was the same before and after the short-circuit test, exhibiting line voltage of 620 V. Accordingly, it was confirmed that the demagnetization did not occur even by making the magnetic coercive forces in the surfaces other than the stator-side surface as high as that in the stator-side surface in comparison with those in the inner central portions of the magnets.

Comparative Example 1

A plurality of magnets made of the same material and having the same dimensions as in Example 1 which had not been subjected to the diffusion treatment were provided and the same test as in Example 1 was conducted. Before being mounted, they had 1200 kA/m of magnetic coercive force measured. A short-circuit test was conducted and then it was found that electromotive force was 620 V before the short-circuit test and was 520 V after the short-circuit test, exhibiting reduction of about 16%. It was confirmed that the demagnetization occurred in the magnets whose magnetic coercive forces had not increased in the stator-side surfaces.

Having thus described certain embodiments of the present invention, it is to be understood that the invention defined by the appended claims is not to be limited by particular details set forth in the above description as many apparent variations thereof are possible without departing from the spirit or scope thereof as hereinafter claimed. The following claims are provided to ensure that the present application meets all statutory requirements as a priority application in all jurisdictions and shall not be construed as setting forth the full scope of the present invention.

The invention claimed is:

1. A permanent magnet rotating machine comprising:
a rotor comprising one or more Nd-based rare earth sintered permanent magnets in each of two or more insertion holes, the insertion holes being formed in a circumferential direction in a rotor core; and
a stator disposed with a clearance from an outer peripheral face of the rotor and formed by winding a winding wire through a stator core having two or more slots,
wherein a magnetic coercive force in a stator-side surface region of each of the Nd-based rare earth sintered permanent magnets is greater than that in an inner central portion by 300 kA/m or more, the inner central portion being an inner portion at a depth of at least 5 mm from every outer face of the permanent magnet and wherein each of the Nd-based rare earth permanent magnets is prepared using heat treatment to diffuse Dy or Tb from a stator-side surface of a Nd-based rare earth sintered magnet body toward the inner central portion in order to distribute the magnetic coercive force, wherein the sintering temperature of the sintered magnet body is from 900° C. to 1,250° C.

2. The permanent magnet rotating machine according to claim 1, wherein the magnetic coercive force is greater only in the stator-side surface region of each of the permanent magnet.

3. The permanent magnet rotating machine according to claim 1, wherein each of the permanent magnets has been divided into magnet pieces.

4. The permanent magnet rotating machine according to claim 1, wherein each of the permanent magnets is in form of rectangle having a side of 10 mm or longer in the circumferential direction and a side of 10 mm or longer along a rotary shaft.

5. The permanent magnet rotating machine according to claim 1, wherein heat treatment takes place at a temperature lower than or equal to the sintering temperature of the sintered magnet body.

6. The permanent magnet rotating machine according to claim 1, wherein heat treatment takes place at a temperature of greater than or equal to 350° C. and at a temperature lower than or equal to the sintering temperature of the sintered magnet body.

7. The permanent magnet rotating machine according to claim 1, wherein heat treatment takes place at a temperature of at greater than or equal to 350° C. and at a temperature lower than or equal to 10° C. below the sintering temperature of the sintered magnet body.

8. The permanent magnet rotating machine according to claim 1, wherein heat treatment takes place at a temperature of 900° C.

9. The permanent magnet rotating machine according to claim 1, wherein the sintering temperature of the sintered magnet body is from 1,000° C. to 1,100° C.

* * * * *